United States Patent [19]

Sawada et al.

[11] Patent Number: 5,149,917
[45] Date of Patent: Sep. 22, 1992

[54] WIRE CONDUCTOR FOR HARNESS

[75] Inventors: Kazuo Sawada; Atsuhiko Fujii; Yoshihiro Nakai; Naoyuki Ohkubo; Hajime Shiraishi; Fumio Ono; Katsushi Matsuda, all of Osaka; Kazunori Tsuji, Mie, all of Japan

[73] Assignees: Sumitomo Electric Industries, Ltd., Osaka; Sumitomo Wiring Systems, Ltd., Yokkaichi, both of Japan

[21] Appl. No.: 696,503

[22] Filed: May 7, 1991

[30] Foreign Application Priority Data

May 10, 1990 [JP] Japan .................. 2-121968
Dec. 28, 1990 [JP] Japan .................. 2-409162

[51] Int. Cl.$^5$ .............................. H01B 1/02
[52] U.S. Cl. .................. 174/129 R; 174/110 R; 174/126.2; 174/133 R
[58] Field of Search ........... 174/128.1, 129 R, 133 R, 174/126.2, 110 R; 420/470; 148/433

[56] References Cited

U.S. PATENT DOCUMENTS

| | | | |
|---|---|---|---|
| 1,751,386 | 3/1930 | Belden | 174/706 |
| 2,136,919 | 11/1938 | Hensel et al. | 420/470 |
| 3,683,103 | 8/1972 | Mancino | 174/126.2 |
| 3,760,043 | 9/1973 | Pemberton | 174/128.1 |
| 3,940,290 | 2/1976 | Pryor et al. | 148/433 |
| 4,039,743 | 8/1977 | Gommans | 174/128.1 |
| 4,486,250 | 12/1984 | Nakajima | 148/433 |
| 4,656,003 | 4/1987 | Miyafuji et al. | 148/433 X |
| 5,021,105 | 6/1991 | Asai et al. | 420/470 X |

FOREIGN PATENT DOCUMENTS

| | | |
|---|---|---|
| 0190386 | 8/1986 | European Pat. Off. . |
| 0331182 | 9/1989 | European Pat. Off. . |
| 33328 | 2/1985 | Japan . |
| 127810 | 6/1986 | Japan . |
| 66131 | 3/1990 | Japan . |
| 85330 | 3/1990 | Japan . |
| 2093064 | 8/1982 | United Kingdom ............ 420/470 |

OTHER PUBLICATIONS

Japanese Industrial Standard (JIS C 3102) pp. 1-4, (in English) (1984).
Japanese Industrial Standard (JIS H 3110) pp. 1-11, (in English) (1986).
Metal Progress, vol. 103, No. 2, Feb. 1, 1973, Metals Park, Ohio, US, pp. 66-69, Copper Development Assoc.: "Properties and Applications of Widely Used Wrought Copper and Copper Alloys".

*Primary Examiner*—Morris H. Nimmo
*Attorney, Agent, or Firm*—W. G. Fasse

[57] ABSTRACT

Strands of a copper alloy containing 0.2 to 10 percent by weight of Sn are braided to form a stranded wire for a wire conductor for a harness having a conductor sectional area of 0.03 to 0.3 mm$^2$. After the braiding, preferably stranded wire is heat treated so that its tensile strength is maintained at a prescribed level. The wire conductor for a harness has a breaking strength which is equivalent to that of a conventional harness wire, and is hardly broken by an impact. The wire conductor maintains its straightness, and strand ends do not fray upon cutting.

8 Claims, 1 Drawing Sheet

WIRE CONDUCTOR FOR HARNESS

FIELD OF THE INVENTION

The present invention relates to a wire conductor for a harness, useful or an electrical system of an automobile, for example.

BACKGROUND INFORMATION

With recent performance improvements, the electrical system of an automobile is wired in a number of sections such as those of various control circuits requiring a high reliability. On the other hand, a lightweight automobile is increasingly required to save energy.

In general, a wire conductor for wiring an automobile is mainly made of a stranded wire which is obtained by braiding annealed copper wires defined under JIS C 3102 or wires plated with tin. Such a stranded wire is concentrically coated with an insulating material such as vinyl chloride, bridged vinyl or bridged polyethylene, to form a wire.

In automobile wiring circuits, the number of signal current circuits for control purposes etc. in particular, has increased in recent years. A wire for such circuits is formed by a conductor having a diameter is in excess of an electrically required level for maintaining the necessary mechanical strength, in spite of sufficient current carrying capacity.

In order to reduce the weight of such a wire, an attempt has been made to make its conductor of aluminum including aluminum alloy.

In general, however, aluminum is so inferior in strength that it is necessary to increase the outer diameter of the conductor or the number of stranded wires, in order to attain sufficient strength. Consequently, the amount of the insulating material is increased which in turn requires a large space for the wiring. Thus, the weight of the wire cannot be sufficiently reduced and the cost for the insulating material is increased.

SUMMARY OF THE INVENTION

It is an object of the present invention to provide a wire conductor for a harness having a breaking strength that is equivalent to that of a conventional harness wire even if its weight is reduced by a reduction in diameter, which is hardly broken by an impact, and which has an excellent straightness and no end fraying of the individual strands when the stranded wire is cut.

The present wire conductor for a harness is formed by a stranded wire which is obtained by braiding strands of a copper alloy containing 0.2 to 10 percent by weight of Sn, with a conductor sectional area of 0.03 to 0.3 mm$^2$.

According to the present invention, the conductor sectional area is set in the range of 0.03 to 0.3 mm$^2$ since it is difficult to compress a terminal when assembling the harness working, if the value is less than 0.03 mm$^2$, while the weight of the wire conductor cannot be sufficiently reduced if the value exceeds 0.3 mm$^2$.

According to the present invention, the stranded wire is preferably circularly compressed after the same is formed by braiding strands having circular sections.

The present wire conductor for a harness is formed as a stranded wire rather than a solid single wire in order to attain an improvement in reliability against repeated bending.

Strands employed in the present invention are made of copper alloy containing 0.2 to 10 percent by weight of Sn. The strands may also be made of bronze containing not more than 0.5 percent by weight of phosphorus.

According to a first preferred embodiment of the present invention, the Sn content is in a range of 0.2 to 2.5 percent by weight. The Sn range of 0.02 to 2.5 percent by weight is preferred since it improves the breaking force is reduced if the Sn content is less than 00.2 percent by weight the breaking strength is reduced. The conductivity drops below 50% and the wire may enter an unpreferable state depending on the circuit type if the Sn content exceeds 2.5 percent by weight.

According to the preferred first embodiment of the present invention, the copper material containing 0.2 to 2.5 percent by weight of Sn, has a spring property as compared with a generally used annealed copper material. Due to this spring property the copper material may cause a problem of end fraying making it difficult to crimp a terminal fitting to a conductor end. However, such end fraying can be suppressed or avoided by circularly compressing the stranded wire. Further, the circular compression improved the straightness of the wire conductor.

It has been found that the impact resistance is also improved by such a circular compression.

In the first embodiment of the present invention, the circularly compressed stranded wire is preferably heat treated so that its tensile strength is in a range of 80 to 95% of that before the heat treatment. The impact resistance is further improved and the fraying of the stranded wire is even further suppressed by such heat treatment. Although the breaking tensile strength is lowered by this heat treatment, it is preferable to control the lowered breaking strength in the range of 80 to 95% of that before the heat treatment, as hereinabove described. If the breaking strength after the heat treatment is larger than, 95% of that before the heat treatment, fraying or wire deformation may be caused due to an insufficient improvement of the impact value. If the tensile strength drops below 80% of that before the heat treatment, on the other hand, the breaking strength is extremely lowered to lose the alloying effect of improving the breaking strength by the prescribed content of Sn.

The heat treatment is preferably performed in a temperature range of 180° to 350° C. If the temperature is less than 180° C., the effect of improving the impact value may not be sufficiently attained, while the breaking force may be significantly lowered if the temperature exceeds 350° C.

The heat treatment time is preferably in excess of 10 minutes. If the heat treatment time is less than 10 minutes, the effect of improving the impact value may not be sufficiently attained.

According to a second embodiment of the present invention, the Sn content is 2 to 10 percent by weight.

At least 2% wt of Sn improve the breaking strength. If the Sn content exceeds 10 percent by weight, on the other hand, it is impossible to attain mass production ith ordinary steps since wire deformation and end fraying cannot be suppressed even if a heat treatment is performed.

In the second embodiment of the present invention, the stranded wire is preferably heat treated so that its tensile strength is in a range of 30 to 60% as compared with that before the heat treatment.

Due to a heat treatment, the impact resistance can be further improved and fraying of the stranded wire can be further suppressed. While breaking tensile strength is lowered by this heat treatment, it is preferable to control the lowered breaking tentile strength in a range of 30 to 60% compared to that before the heat treatment. If the breaking force after the heat treatment is larger than 60% of that before the heat treatment, the impact resistance cannot be sufficiently improved, and a problem of end fraying or wire deformation may be caused. If the tensile strength drops below 30% of that before the heat treatment, on the other hand, the breaking strength is significantly lowered and the effect of alloying for improving the breaking strength with a prescribed content of Sn is lost.

The heat treatment is preferably performed in a temperature range of 180° to 500° C. If the heat treatment temperature is less than 180° C., the effect of improving the impact value may not be sufficiently attained, while the breaking force may be extremely lowered if the heat treatment temperature exceeds 500° C.

The heat treatment time is preferably in excess of 10 minutes. If the heat treatment time is less than 10 minutes, the effect of improving the impact value may not be sufficiently attained.

As hereinabove described, the present wire conductor for a harness has a high breaking tensile strength and a high impact value, with an excellent wire straightness and small end fraying. Thus, the weight of the present wire conductor for a harness has been reduced as compared with a conventional wire.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
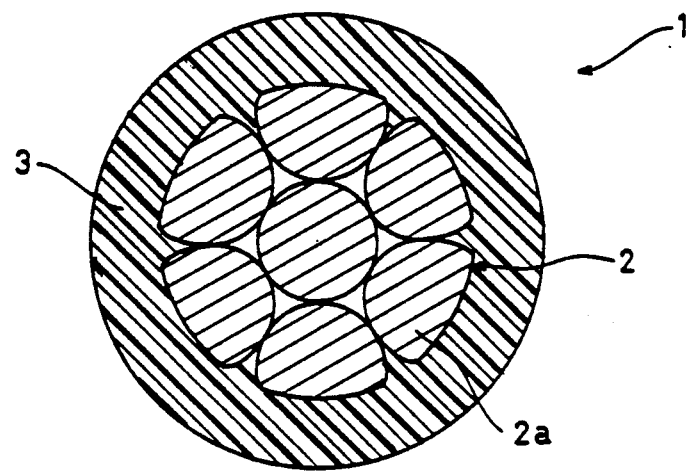
FIG. 1 is a sectional view showing a wire for a harness comprising a stranded wire which is circularly compressed after the same has been formed by braiding strands having circular sections.

Referring to FIG. 1, a harness wire 1 comprises a stranded wire 2, which is so circular compressed that outer peripheral surfaces of outer strands 2a define a substantially circular configuration as a whole. An insulating film 2 is provided along the outer periphery of the circularly compressed stranded wire 1.

Figure 2:
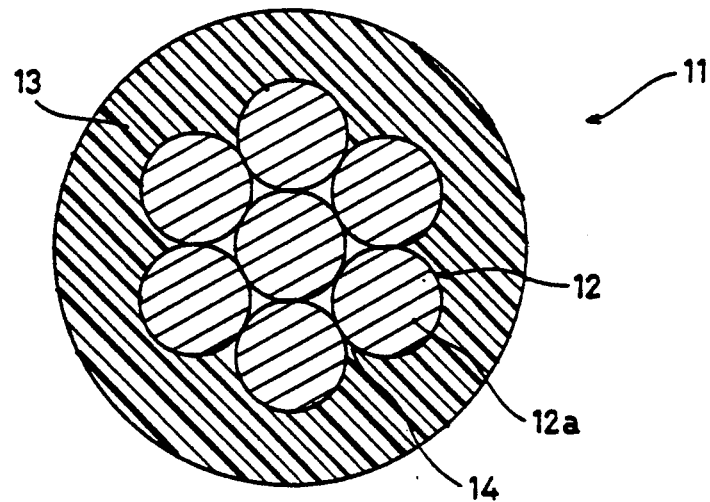
FIG. 2 is a sectional view showing a wire for a harness comprising a stranded wire which is not circularly compressed.

Referring to FIG. 2, a harness wire 11 comprises a stranded wire 12, which is formed by braiding strands 12a, and an insulating film 13 provided around the stranded wire 12. The insulating film 13 also fills up clearances 14 between the strands 12a. However, such clearances 14 need not be filled up with the insulating film 13, since these clearances are not concerned with insulability. Due to such excessive filling up the clearances 14, the amount of the material for the insulating film 13 is increased and the weight of the wire 11 cannot be sufficiently reduced.

On the other hand, smaller clearances are defined between the strands 2a of the harness wire 1 shown in FIG. 1, whereby the amount of the material for the insulating film 3 can be reduced to reduce the weight of the harness wire 1. Although the wire has the same sectional area, the outer diameter of the wire 1 can be reduced due to the smaller clearances in the corners where the individual strands meet. In addition, end fraying is suppressed by circularly compressing the stranded wire 2. Besides the wire 1 has an improved straightness due to the compressing.

Example I according to the first embodiment of the present invention will now be described.

EXAMPLE I

Samples were prepared of alloys having Sn contents shown in Table 1. For each sample, seven strands were braided to form a stranded wire. Except for those of the non-compressed samples, the stranded wires were passed through holes in dies, to be circularly compressed. Further, the compressed stranded wires were heat treated under heat treatment conditions shown in Table 1. As to the conventional sample No. 11, generally used annealed copper wires were braided to form a stranded wire.

Table 1 also shows conductivity values (IACS, %), breaking force retention rates (%) after heat treatment, breaking strength values (kgf), impact values (kg.m), weight values (g/m), and states of wire straightness and end fraying, which were measured or evaluated as to the stranded wires.

TABLE 1

|  | No. | Sn Content (wt. %) | Strand Diameter (mm) | Compression | Heat Treatment Condition | Conductivity (%) | Breaking Strength Retention Rate (%) | Breaking Strength (kgf) | Impact Value (kg m) | Weight | Wire Straightness | End Fraying |
|---|---|---|---|---|---|---|---|---|---|---|---|---|
| Invention Sample | 1 | 0.5 | 0.18 | Yes | 220° C. × 2H | 63 | 92 | 13.0 | 0.5 | 1.6 | excellent | None |
|  | 2 | 1.8 | 0.18 | Yes | 250° C. × 2H | 38 | 91 | 14.2 | 0.6 | 1.6 | excellent | None |
|  | 3 | 1.5 | 0.18 | Yes | 250° C. × 2H | 42 | 90 | 13.7 | 0.5 | 1.6 | excellent | None |
|  | 4 | 0.3 | 0.18 | Yes | 250° C. × 2H | 80 | 83 | 12.0 | 0.5 | 1.6 | excellent | None |
|  | 5 | 2.1 | 0.18 | Yes | 250° C. × 2H | 35 | 93 | 14.5 | 0.6 | 1.6 | excellent | None |
|  | 6 | 0.9 | 0.18 | Yes | 250° C. × 2H | 50 | 86 | 12.8 | 0.5 | 1.6 | excellent | None |
|  | 7 | 2.4 | 0.18 | Yes | 250° C. × 2H | 32 | 94 | 16.0 | 0.8 | 1.6 | excellent | None |
|  | 8 | 0.3 | 0.23 | Yes | 250° C. × 2H | 80 | 83 | 14.8 | 0.6 | 2.6 | excellent | None |
|  | 9 | 2.4 | 0.13 | Yes | 250° C. × 2H | 32 | 94 | 10.0 | 0.4 | 0.8 | excellent | None |
|  | 10 | 1.2 | 0.18 | Yes | 250° C. × 8 min | 45 | 98 | 13.2 | 0.4 | 1.6 | excellent | None |
| Conventional Sample | 11 | 0 | 0.25 | No | None | 100 | 98 | 7.0 | 0.4 | 3.1 | excellent | None |
| Comparative Sample | 12 | 0 | 0.18 | Yes | 250° C. × 2H | 100 | 46 | 5.2 | 0.4 | 1.6 | excellent | None |
|  | 13 | 0.1 | 0.18 | Yes | 250° C. × 2H | 93 | 87 | 6.0 | 0.4 | 1.6 | excellent | None |
|  | 14 | 2.7 | 0.18 | Yes | 250° C. × 2H | 23 | 97 | 15.8 | 0.4 | 1.6 | excellent | None |

TABLE 1-continued

| No. | Sn Content (wt. %) | Strand Diameter (mm) | Compression | Heat Treatment Condition | Conductivity (%) | Breaking Strength Retention Rate (%) | Breaking Strength (kgf) | Impact Value (kg m) | Weight | Wire Straightness | End Fraying |
|---|---|---|---|---|---|---|---|---|---|---|---|
| 15 | 0.5 | 0.18 | No | None | 63 | 98 | 17.0 | 0.1 | 1.6 | inferior | frayed |
| 16 | 0.3 | 0.16 | No | 200° C. × 2H | 80 | 85 | 11.5 | 0.2 | 1.4 | rather inferior | rather frayed |

As clearly understood from Table 1, the present samples Nos. 1 to 10 were higher in breaking strength than the conventional sample No. 11, while the same had lighter weight values, of about ⅓ to ⅔. The breaking strength values of the comparative samples Nos. 12 and 13, containing smaller amounts of Sn, were much lower than those of the present samples. In the comparative sample No. 14 containing a larger amount of Sn, the conductivity value was significantly reduced although its breaking force was retained at a high level. The comparative samples Nos. 15 and 16, which were not circularly compressed, were inferior in wire straightness, and caused end fraying.

All of the samples Nos. 1 to 10 of the invention were heat treated after circular compression. Table 2 shows additional samples Nos. 17 to 19, which were prepared for the purpose of studying the influence of such heat treatment as well as the heat treatment conditions. Table 2 again shows the data of the present sample No. 1, in order to facilitate the comparison.

150° C., i.e., a temperature lower than 180° C., the impact value was not much improved.

As understood from the above results, it is preferable to perform the heat treatment after the compression so that the tensile strength is in a range of 80 to 95% of that before the heat treatment. Further, the heat treatment is preferably performed at a temperature of 180° to 350° C. for at least 10 minutes.

Examples II to V according to the second embodiment of the present invention will now be described.

EXAMPLE II

Samples were prepared of phosphor bronze materials defined under JIS H 3110, as shown in Table 3. For each sample, seven strands were braided to form a stranded wire. The samples Nos. 2-1, 2-2 and 2-3 shown in Table 3 correspond to C5161, C5191 and C5121 under JIS H 3110 respectively. The conventional sample No. 2-4 was prepared of strands of copper wires containing no Sn and P. Samples Nos. 2-5, 2-6 and 2-7

TABLE 2

| No. | Sn Content (wt. %) | Strand Diameter (mm) | Compression | Heat Treatment Condition | Conductivity (%) | Breaking Strength Retention Rate (%) | Breaking Strength (kgf) | Impact Value (kg m) | Weight (g/m) | Wire Straightness | End Frayed |
|---|---|---|---|---|---|---|---|---|---|---|---|
| 1 | 0.5 | 0.18 | Yes | 220° C. × 2H | 63 | 92 | 13.0 | 0.5 | 1.6 | Excellent | None |
| 17 | 0.5 | 0.18 | Yes | None | 61 | 98 | 14.0 | 0.1 | 1.6 | rather inferior | Rather Disjointed |
| 18 | 0.5 | 0.18 | Yes | 400° C. × 2H | 63 | 50 | 7.0 | 0.4 | 1.6 | Excellent | None |
| 19 | 0.5 | 0.18 | Yes | 150° C. × 2H | 63 | 97 | 13.9 | 0.2 | 1.6 | rather inferior | Rather Disjointed |

Comparing the heat treated sample No. 1 with the sample No. 17 which was not heat treated, it is understood that the impact value is improved and the wire deformation and end fraying are suppressed by the heat treatment after circular compression, although the breaking strength is slightly reduced.

In the sample No. 18 which was heat treated at 400° C., i.e., a temperature higher than 350° C., the breaking strength retention rate was 50%. Namely, the breaking force was reduced similarly to the conventional sample No. 11. In the sample No. 19 which was heat treated at were prepared for the purpose of comparison.

Table 3 also shows conductivity values (IACS, %), breaking force retention rates (%) after heat treatment, breaking strength values (kgf), impact values (kg.m), weight values (g/m), and states of wire straightness and end disjointing, fraying which were measured or evaluated for the samples.

TABLE 3

| | No. | Sn Content (wt. %) | P Content (wt. %) | Strand Diameter | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|---|---|
| Invention Sample | 2-1 | 4.1 | 0.08 | 0.18 | 300° C. × 3H | 20 | 33 | 6.3 | 1.1 | 1.6 | Excellent | None |
| | 2-2 | 5.9 | 0.12 | 0.18 | 300° C. × 3H | 15 | 50 | 9.5 | 1.2 | 1.6 | Excellent | None |
| | 2-3 | 7.9 | 0.20 | 0.18 | 300° C. × 3H | 10 | 58 | 10.5 | 1.2 | 1.6 | Excellent | None |
| Conventional Sample | 2-4 | 0 | 0 | 0.2 | None | 100 | 98 | 4.5 | 0.4 | 2.0 | Excellent | None |
| Comparative Sample | 2-5 | 0 | 0 | 0.18 | 300° C. × 3H | 100 | 38 | 4.0 | 0.4 | 1.6 | Excellent | None |
| | 2-6 | 1.3 | 0 | 0.18 | 300° C. × 3H | 45 | 20 | 4.5 | 0.6 | 1.6 | Excellent | None |
| | 2-7 | 11.5 | 0 | 0.18 | 300° C. × 3H | 8 | 59 | 11.5 | 1.2 | 1.26 | Inferior | Yes |

As clearly understood from Table 3, the present samples Nos. 2-1 to 2-3 had a higher breaking force strength and were lower in weight than the conventional sample No. 2-4. The breaking force values of the comparative samples Nos. 2-5 and 2-6, containing smaller amounts of Sn, were much lower than those of the inventive present samples. In the comparative sample No. 2-7 containing a larger amount of Sn, the conductivity value was substantially reduced although its breaking strength was retained at a high level. Further, this sample was inferior in wire straightness and end fraying was observed.

All of the present samples Nos. 2-1 to 2-3 shown in Table 3 were heat treated after braiding. Table 4 shows additional samples Nos. 2-8 to 2-11, which were prepared for the purpose of studying the influence of the heat treatment as well as the heat treatment conditions. Table 4 shows the data of the inventive present sample No. 2-2, in order to facilitate comparison.

EXAMPLE III

Samples were prepared of phosphor bronze materials defined under JIS H 3110 as shown in Table 5, similarly to Example II. For each sample, seven strands were braided to form a stranded wire. Except for the wire of the conventional sample No. 3-4, the stranded wires were passed through holes of dies to be circularly compressed. The heat treatment was performed under the conditions shown in Table 5. The conventional sample No. 3-4 was made of a general stranded wire formed by braiding annealed copper wires, similarly to the conventional sample No. 2-4 shown in Table 3.

Table 5 also shows the characteristics of the as-

TABLE 4

| No. | Sn Content (wt. %) | P Content (wt. %) | Strand Diameter | Heat Treatment Condition | Conductivity (%) | Breaking Strength Retention Rate (%) | Breaking Strength (kgf) | Impact Value (kg m) | Weight (g/m) | Wire Straightness | End Fraying |
| --- | --- | --- | --- | --- | --- | --- | --- | --- | --- | --- | --- |
| 2-2 | 5.9 | 0.12 | 0.18 | 300° C. × 3H | 15 | 50 | 9.5 | 1.2 | 1.6 | Excellent | None |
| 2-8 | 5.9 | 0.12 | 0.18 | None | 14 | 98 | 19.2 | 0.1 | 1.6 | Inferior | Yes |
| 2-9 | 5.9 | 0.12 | 0.18 | 550° C. × 3H | 15 | 17 | 3.2 | 0.4 | 1.6 | Excellent | None |
| 2-10 | 5.9 | 0.12 | 0.18 | 150° C. × 3H | 15 | 97 | 18.6 | 0.2 | 1.6 | Inferior | Yes |
| 2-11 | 5.9 | 0.12 | 0.18 | 300° C. × 5 mm | 15 | 96 | 18.4 | 0.3 | 1.6 | Inferior | Yes |

Comparing the heat treated sample No. 2-2 with the sample No. 2-8 which was not heat treated, it is seen formed stranded wires, which were measured and evaluated similarly to Example I.

TABLE 5

| | No. | Sn Content (wt. %) | P Content (wt. %) | Strand Diameter | Compression | Heat Treatment Condition | Conductivity (%) | Breaking Strength Retention Rate (%) | Breaking Strength (kgf) | Impact Value (kg m) | Weight (g/m) | Wire Straightness | End Fraying |
| --- | --- | --- | --- | --- | --- | --- | --- | --- | --- | --- | --- | --- | --- |
| Invention Sample | 3-1 | 4.1 | 0.08 | 0.18 | Yes | 300° C. × 3H | 20 | 33 | 6.3 | 1.3 | 1.55 | Excellent | None |
| | 3-2 | 5.9 | 0.12 | 0.18 | Yes | 300° C. × 3H | 15 | 50 | 9.5 | 1.4 | 1.55 | Excellent | None |
| | 3-3 | 7.9 | 0.20 | 0.18 | Yes | 300° C. × 3H | 10 | 58 | 10.5 | 1.4 | 1.55 | Excellent | None |
| Conventional Sample | 3-4 | 0 | 0 | 0.2 | No | None | 100 | 98 | 4.5 | 0.4 | 2.0 | Excellent | None |
| Comparative Sample | 3-5 | 0 | 0 | 0.18 | Yes | 300° C. × 3H | 100 | 38 | 4.0 | 0.6 | 1.55 | Excellent | None |
| | 3-6 | 1 | 0 | 0.18 | Yes | 300° C. × 3H | 45 | 20 | 4.5 | 0.8 | 1.55 | Excellent | None |
| | 3-7 | 11 | 0 | 0.18 | Yes | 300° C. × 3H | 8 | 59 | 11.5 | 1.4 | 1.55 | Rather Inferior | Rather Disjointed | that the impact value is increased and wire deformation and end fraying are suppressed by performing the heat treatment after the braiding, although the breaking force is reduced.

In the sample No. 2-9 which was heat treated at 550° C., i.e., a temperature higher than 500° C., the breaking force retention rate was 17%. In the sample No. 2-10 which was heat treated at 150° C., i.e., a temperature lower than 180° C., the impact value was not much improved.

As clearly seen from the above results, the stranded wire is preferably heat treated after braiding so that its tensile strength is in a range of 30 to 60% of that before the heat treatment.

The sample No. 2-11 was heat treated at 300° C. for 5 minutes. As the result, the impact value was reduced as compared with the sample No. 2-2, as shown in Table 4. Thus, the heat treatment is preferably performed for at least 10 minutes.

As clearly from Example III, the samples Nos. 3-1 to 3-3 of the invention had a higher breaking strength lower a weight than, the conventional sample No. 3-4. The breaking strength values of the comparative samples Nos. 3-5 and 3-6, which contained smaller amounts of Sn, were much lower than those of the present samples. The conductivity value of the comparative sample No. 3-7, which contained a larger amount of Sn, was much reduced although its breaking force was retained at a high level.

All of the samples Nos. 3-1 to 3-3 of the invention shown in Table 5 were heat treated after circular compression. Table 6 shows additional samples Nos. 3-8 to 3-11, which were prepared for the purpose of studying the influence of such the heat treatment as well as the heat treatment conditions. Table 6 also shows the data of the sample No. 3-2, in order to facilitate comparison.

TABLE 6

| No. | Sn Content (wt. %) | P Content (wt. %) | Strand Diameter | Compression | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|---|---|
| 3-2 | 5.9 | 0.12 | 0.18 | Yes | 300° C. × 3H | 15 | 50 | 9.5 | 1.4 | 1.55 | Excellent | None |
| 3-8 | 5.9 | 0.12 | 0.18 | Yes | None | 14 | 98 | 19.5 | 0.2 | 1.55 | Rather Inferior | rather frayed |
| 3-9 | 5.9 | 0.12 | 0.18 | Yes | 550° C. × 3H | 15 | 17 | 3.2 | 0.6 | 1.55 | Excellent | None |
| 3-10 | 5.9 | 0.12 | 0.18 | Yes | 150° C. × 3H | 15 | 97 | 18.6 | 0.4 | 1.55 | Rather Inferior | rather frayed |
| 3-11 | 5.9 | 0.12 | 0.18 | Yes | 300° C. × 5 min | 15 | 96 | 18.4 | 0.5 | 1.55 | Rather Inferior | rather frayed |

Comparing the heat treated sample No. 3-2 with the sample No. 3-8 which was not heat treated, it is seen that the impact value is improved and wire deformation and end fraying are, suppressed by performing the heat treatment after the circular compression, although the breaking force is slightly reduced.

In the sample No. 3-9 which was heat treated at 550° C., i.e., a temperature higher than 500° C., the breaking force retention rate was 17% and the breaking force dropped below that of the conventional sample No. 3-4. In the sample No. 3-1 which was heat treated at 150° C., i.e., a temperature lower than 180° C., the impact value was not much improved.

As clearly seen from the above results, it is preferable to perform the heat treatment after the compression so that the tensile strength is in a range of 30 to 60% of that before the heat treatment. In the sample No. 3-11 which was heat treated at 300° C. for 5 minutes, it was impossible to attain a sufficient impact value. Thus, it is preferable to perform the heat treatment for at least 10 minutes.

EXAMPLE IV

Samples 4-1 to 4-10 were prepared of copper alloys containing Sn in amounts shown in Table 7. For each sample, seven strands were braided to form a stranded wire. The conventional sample No. 4-7 shown in Table 7 is identical to the conventional samples Nos. 2-4 and 3-4 shown in Tables 3 and 5.

Table 7 also shows the characteristics of the samples, which were evaluated similarly to Examples II and III.

TABLE 7

| | No. | Sn Content (wt. %) | Strand Diameter | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|---|
| Invention Sample | 4-1 | 2.2 | 0.18 | 300° C. × 3H | 35 | 26 | 5.0 | 1.0 | 1.6 | Excellent | None |
| | 4-2 | 4.3 | 0.18 | 300° C. × 3H | 20 | 33 | 6.3 | 1.1 | 1.6 | Excellent | None |
| | 4-3 | 6.1 | 0.18 | 300° C. × 3H | 15 | 50 | 9.5 | 1.2 | 1.6 | Excellent | None |
| Conventional Sample | 4-4 | 3.1 | 0.18 | 300° C. × 3H | 25 | 30 | 5.8 | 1.1 | 1.6 | Excellent | None |
| Comparative Sample | 4-5 | 7.2 | 0.13 | 300° C. × 3H | 12 | 55 | 5.5 | 1.0 | 0.8 | Excellent | None |
| | 4-6 | 5.3 | 0.18 | 300° C. × 3H | 18 | 39 | 7.5 | 1.1 | 1.6 | Excellent | None |
| | 4-7 | 0 | 0.2 | 300° C. × 3H | 100 | 98 | 4.5 | 0.4 | 2.0 | Excellent | None |
| | 4-8 | 0 | 0.18 | 300° C. × 3H | 100 | 38 | 4.0 | 0.4 | 1.6 | Excellent | None |
| | 4-9 | 1.3 | 0.18 | 300° C. × 3H | 45 | 20 | 4.5 | 0.6 | 1.6 | Excellent | None |
| | 4-10 | 11.5 | 0.18 | 300° C. × 3H | 8 | 59 | 11.5 | 1.2 | 1.6 | Inferior | frayed |

As clearly seen from Table 7, the present samples Nos. 4-1 to 4-6 have a higher breaking strength and a lower weight than the conventional sample No. 4-7. The breaking strength values of the comparative samples Nos. 4-8 and 4-9, containing smaller amounts of Sn, were lower than those of the inventive present samples. The conductivity value of the comparative sample No. 4-10, containing a larger amount of Sn, was extremely substantially reduced although its breaking force was retained at a high level. Further, the comparative sample was inferior in wire straightness, and it caused end fraying.

All of the samples Nos. 4-1 to 4-6 shown in 7 were heat treated. Table 8 shows additional samples Nos. 4-11 to 4-14, which were prepared for the purpose of studying the influence of the heat treatment as well as the heat treatment conditions. Table 8 also shows the data of the sample No. 4-3, in order to facilitate the comparison.

TABLE 8

| No. | Sn Content (wt. %) | Strand Diameter (mm) | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|
| 4-3 | 6.1 | 0.18 | 300° C. × 3H | 15 | 50 | 9.5 | 1.2 | 1.6 | Excellent | None |
| 4-11 | 6.1 | 0.18 | None | 14 | 98 | 19.2 | 0.1 | 1.6 | Inferior | Disjointed |
| 4-12 | 6.1 | 0.18 | 550° C. × 3H | 15 | 17 | 3.2 | 0.4 | 1.6 | Excellent | None |
| 4-13 | 6.1 | 0.18 | 150° C. × 3H | 15 | 97 | 18.6 | 0.2 | 1.6 | Inferior | Fraying |
| 4-14 | 6.1 | 0.18 | 300° C. × 5 min | 15 | 96 | 18.4 | 0.3 | 1.6 | Inferior | Fraying |

Comparing the heat treated sample No. 4-3 with the sample No. 4-11 which was not heat treated, it is clearly seen that the impact value is improved and wire deformation and end fraying are suppressed by performing the heat treatment after the braiding, although the breaking strength is slightly reduced.

In the sample No. 4-12 which was heat treated at 550° C., i.e., a temperature higher than 500° C., the breaking strength retention rate was 17% and the breaking force dropped below that of the conventional sample. In the sample No. 4-13 which was heat treated at 150° C., i.e., a temperature lower than 180° C., the impact value was not much improved.

As clearly seen from the above results, it is preferable to perform the heat treatment after the compression so that the tensile strength is in a range of 30 to 60% of that before the heat treatment. Further, such heat treatment is preferably performed at a temperature of 180° to 500° C. for at least 10 minutes.

EXAMPLE V

Samples were prepared of copper materials having Sn contents shown in Table 9. For each sample, seven strands were braided to form a stranded wire. Such stranded wires were compressed similarly to Example III.

Table 9 also shows the characteristics of the as-formed stranded wires.

prepared for the purpose of studying the influence of the heat treatment as well as the heat treatment conditions. Table 10 shows the data of the sample No. 5-3, in order to facilitate the comparison.

TABLE 10

| No. | Sn Content (wt. %) | Strand Diameter (mm) | Compression | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|---|
| 5-3 | 6.1 | 0.18 | Yes | 300° C. × 3H | 15 | 50 | 9.5 | 1.4 | 1.55 | Excellent | None |
| 5-11 | 6.1 | 0.18 | Yes | None | 14 | 98 | 19.5 | 0.2 | 1.55 | Rather Inferior | Rather Disjointed |
| 5-12 | 6.1 | 0.18 | Yes | 550° C. × 3H | 15 | 18 | 3.5 | 1.0 | 1.55 | Excellent | None |
| 5-13 | 6.1 | 0.18 | Yes | 150° C. × 3H | 15 | 97 | 19.3 | 0.3 | 1.55 | Rather Inferior | Rather Frayed |
| 5-14 | 6.1 | 0.18 | Yes | 300° C. × 5 min | 15 | 97 | 19.1 | 0.4 | 1.55 | Rather Inferior | Rather Frayed |

Comparing the heat treated sample No. 5-3 with the sample No. 5-11 which was not heat treated, it is seen that the impact value is improved and the wire deformation and end fraying are suppressed by performing the heat treatment after the circular compression, although the breaking force is slightly reduced.

In the sample No. 5-12 which was heat treated at 550° C., i.e., a temperature higher than 500° C., the breaking strength retention rate was 18% and the breaking strength dropped below that of the conventional sample. In the sample No. 5-13 which was heat treated at 150° C., i.e., a temperature lower than 180° C., the impact value was not much improved.

In the sample No. 5-14 which was heat treated for 5 minutes, the impact value was not much improved.

As clearly seen from the above results, it is preferable to perform the heat treatment after the compression so that the tensile strength is in a range of 30 to 60% of that before the heat treatment. Further, the heat treatment is preferably performed at a temperature of 180° to 500° C. for at least 10 minutes.

TABLE 9

| | No. | Sn Content (wt. %) | Strand Diameter (mm) | Compression | Heat Treatment Condition | Conductivity (%) | Breaking Strength Retention Rate (%) | Breaking Strength (kgf) | Impact Value (kg m) | Weight (g/m) | Wire Straightness | End Fraying |
|---|---|---|---|---|---|---|---|---|---|---|---|---|
| Invention Sample | 5-1 | 2.2 | 0.18 | Yes | 300° C. × 3H | 35 | 26 | 5.0 | 1.2 | 1.55 | Excellent | None |
| | 5-2 | 4.3 | 0.18 | Yes | 300° C. × 3H | 20 | 33 | 6.3 | 1.3 | 1.55 | Excellent | None |
| | 5-3 | 6.1 | 0.18 | Yes | 300° C. × 3H | 15 | 50 | 9.5 | 1.4 | 1.55 | Excellent | None |
| | 5-4 | 3.1 | 0.18 | Yes | 300° C. × 3H | 25 | 30 | 5.8 | 1.3 | 1.55 | Excellent | None |
| | 5-5 | 8.2 | 0.13 | Yes | 300° C. × 3H | 12 | 55 | 5.5 | 1.2 | 0.8 | Excellent | None |
| | 5-6 | 5.3 | 0.18 | Yes | 300° C. × 3H | 18 | 39 | 1.1 | 1.3 | 1.55 | Excellent | None |
| Conventional Sample | 5-7 | 0 | 0.2 | No | None | 100 | 98 | 4.5 | 0.4 | 2.0 | Excellent | None |
| Comparative Sample | 5-8 | 0 | 0.18 | Yes | 300° C. × 3H | 100 | 38 | 4.0 | 0.4 | 1.55 | Excellent | None |
| | 5-9 | 1.3 | 0.18 | Yes | 300° C. × 3H | 45 | 20 | 4.5 | 0.6 | 1.55 | Excellent | None |
| | 5-10 | 11.5 | 0.18 | Yes | 300° C. × 3H | 8 | 59 | 11.5 | 1.4 | 1.55 | Rather Inferior | Rather Frayed |

As clearly seen from Table 9 the present samples Nos. 5-1 to 5-6 have a higher breaking strength and a lower weight than the conventional sample No. 5-7. The breaking strength values of the comparative samples Nos. 5-8 and 5-9, containing smaller amounts of Sn, were lower than those of the present samples. The conductivity value of the sample No. 5-10, containing a larger amount of Sn, was extremely substantially reduced although its breaking force was retained at a high level.

All of the samples Nos. 5-1 to 5-6 shown in Table 9 were heat treated after circular compression. Table 10 shows additional samples Nos. 5-11 to 5-14, which were Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A conductor wire for an electrical conductor harness, comprising a conductor cross-sectional area within the range of 0.03 to 0.3 mm$^2$, said conductor comprising a plurality of strands made of a copper alloy containing 0.2 to 10% by weight of Sn, said conductor wire having been produced by the following steps performed in the following sequence:
  (a) braiding a plurality of individual strands to form a braided conductor wire,
  (b) circularly compressing said braided conductor wire, and
  (c) heat treating said braided and circularly compressed conductor wire at a temperature within the range of 180° to 500° C. for at least ten minutes to form a braided, circularly compressed, and heat treated conductor wire, wherein ends of said individual strands hold together substantially without fraying.

2. The conductor wire of claim 1, wherein said copper alloy contains phosphorus of 0.5% wt. at the most.

3. The conductor wire of claim 1, wherein said Sn content is within the range of 0.2 to 2.5% wt.

4. The conductor wire of claim 1, wherein said braided, circularly compressed, and heat treated conductor wire has a tensile strength in the range of 80 to 95% of its tensile strength prior to said heat treating.

5. The conductor wire of claim 1, wherein said heat treating temperature is within the range of 180° to 350° C.

6. The conductor wire of claim 1, wherein said Sn is within the range of 2 to 10% wt.

7. The conductor wire of claim 6, wherein said braided, circularly compressed, and heat treated conductor wire has a tensile strength in the range of 30 to 60% of its tensile strength prior to said heat treating.

8. The conductor wire of claim 1, wherein said individual strands have a circular cross-section prior to said circular compressing.

* * * * *

UNITED STATES PATENT AND TRADEMARK OFFICE
CERTIFICATE OF CORRECTION

PATENT NO. : 5,149,917

DATED : September 22, 1992

INVENTOR(S) : Kazuo Sawada; Atsuhiko Fujii; Yoshihiro Nakai;
Naoyuki Ohkubo; Hajime Shiraishi; Fumio Ono; Katsushi Matsuda; Kazunori Tsuji It is certified that error appears in the above-identified patent and that said Letters Patent is hereby corrected as shown below:

```
TABLE 2, column 6 , box 1, replace "End Frayed" by --End Fraying--;
                   box 3, replace "Rather Disjointed" by
                          --Rather Frayed--;
                   box 5, replace "Rather Disjointed" by
                          --Rather Frayed--.

TABLE 5, column 8 , box 8, replace "Rather Disjointed" by
                          --Rather Frayed--.

TABLE 8, column 10, box 3, replace "Disjointed" by --Frayed--;
                   box 5, replace "Fraying" by --Frayed--;
                   box 6, replace "Fraying" by --Frayed--.

Table 10, column 12, box 3, replace "Rather Disjointed" by
                          --Rather Frayed--.
```

Signed and Sealed this

Twenty-first Day of September, 1993

Attest:

BRUCE LEHMAN

*Attesting Officer*   *Commissioner of Patents and Trademarks*